Sept. 10, 1935.   W. C. ROE   2,013,671
ELECTRICAL SYSTEM AND APPARATUS FOR TRANSMITTING INTELLIGENCE
Filed Nov. 26, 1930   7 Sheets-Sheet 1

Fig. 1.

INVENTOR.
William C. Roe
BY
Slough and Canfield
ATTORNEYS

Sept. 10, 1935. W. C. ROE 2,013,671
ELECTRICAL SYSTEM AND APPARATUS FOR TRANSMITTING INTELLIGENCE
Filed Nov. 26, 1930 7 Sheets-Sheet 2

INVENTOR.
William C. Roe
BY
Slough and Canfield
ATTORNEYS

Sept. 10, 1935.    W. C. ROE    2,013,671
ELECTRICAL SYSTEM AND APPARATUS FOR TRANSMITTING INTELLIGENCE
Filed Nov. 26, 1930    7 Sheets-Sheet 3

Fig. 3

INVENTOR.
William C. Roe
BY
Slough and Canfield
ATTORNEYS

Sept. 10, 1935.  W. C. ROE  2,013,671
ELECTRICAL SYSTEM AND APPARATUS FOR TRANSMITTING INTELLIGENCE
Filed Nov. 26, 1930  7 Sheets-Sheet 4

INVENTOR.
William C. Roe
BY
Slaughand Canfield
ATTORNEYS

Sept. 10, 1935.  W. C. ROE  2,013,671

ELECTRICAL SYSTEM AND APPARATUS FOR TRANSMITTING INTELLIGENCE

Filed Nov. 26, 1930  7 Sheets-Sheet 5

INVENTOR.
BY William C. Roe
Slough and Canfield
ATTORNEYS

Sept. 10, 1935.  W. C. ROE  2,013,671
ELECTRICAL SYSTEM AND APPARATUS FOR TRANSMITTING INTELLIGENCE
Filed Nov. 26, 1930   7 Sheets-Sheet 6

Fig. 9.

INVENTOR.
BY *William C. Roe*
*Slough and Canfield*
ATTORNEYS

Patented Sept. 10, 1935

2,013,671

UNITED STATES PATENT OFFICE 2,013,671

ELECTRICAL SYSTEM AND APPARATUS FOR TRANSMITTING INTELLIGENCE

William C. Roe, Elyria, Ohio, assignor, by mesne assignments, to Printel Communication Systems, Inc., New York, N. Y., a corporation of New York Application November 26, 1930, Serial No. 498,289

9 Claims. (Cl. 177—353)

This invention relates to electrical systems and apparatus for the transmission of intelligence between remotely situated stations.

More particularly, the invention relates to intelligence transmission systems and apparatus in which a plurality of separately actuatable indicators, recorders, or the like at a distant receiving station may be selectively actuated by electric current impulses transmitted thereto from a sending station.

An object of my invention, therefore, is to provide an improved electrical selective system.

Another object of my invention is to provide an improved electrical selective system, wherein a plurality of operative selective means at the receiving station may be substantially concurrently operated by current impulses transmitted from a sending station.

Another object of my invention is to provide an improved electrical selective system wherein a plurality of cooperating selective means disposed at a receiving station and disposed to cooperate to achieve a single selective result, may be substantially concurrently energized by a plurality of series of current impulses, each series adapted to effect a predetermined operative selective movement of one of said selective means.

Another object of my invention is to provide an improved method, system, and apparatus for concurrently effecting multi-directional selective operations.

Other objects will be apparent to those skilled in the art to which this invention appertains.

The invention is fully disclosed in the following description taken in connection with the accompanying drawings, in which.

My invention is susceptible of being employed in many different kinds of electrical systems and for varying purposes and I contemplate employing my improved method of selection, and the apparatus and system for carrying out the method, for such purposes as effecting a two-directional switching operation, for effecting the selection of a particular printing type character for a printing telegraph system, or for any other selective function which may be carried out by electrical selective means.

In the embodiment of my invention illustrated, I provide for the selective operation of a receiver which is provided with a bank of contacts and with a movable contact adapted to be moved into selective engagement with any one of the bank of contacts, each of the contacts of the bank controlling an electric circuit or groups of circuits, and each circuit when energized by selective engagement of the movable contact with one of the bank contacts being adapted to energize an electro-responsive device such as an indicator or the like, and at least one of the contacts of the bank when selected being adapted by the circuit which it controls to shift the control of other selectable contacts from one group of indicating devices to another and some of the circuits controlled by the contacts of the bank being adapted to establish self-energizing contacts therefor to maintain the circuits energized and at least one of the contacts of the bank when selected being adapted to control a circuit to effect de-energization of a self-energized circuit.

My invention is not limited, however, to such a system and apparatus which is illustrated and described herein for the purpose of explaining the invention.

Figures 2, 11:
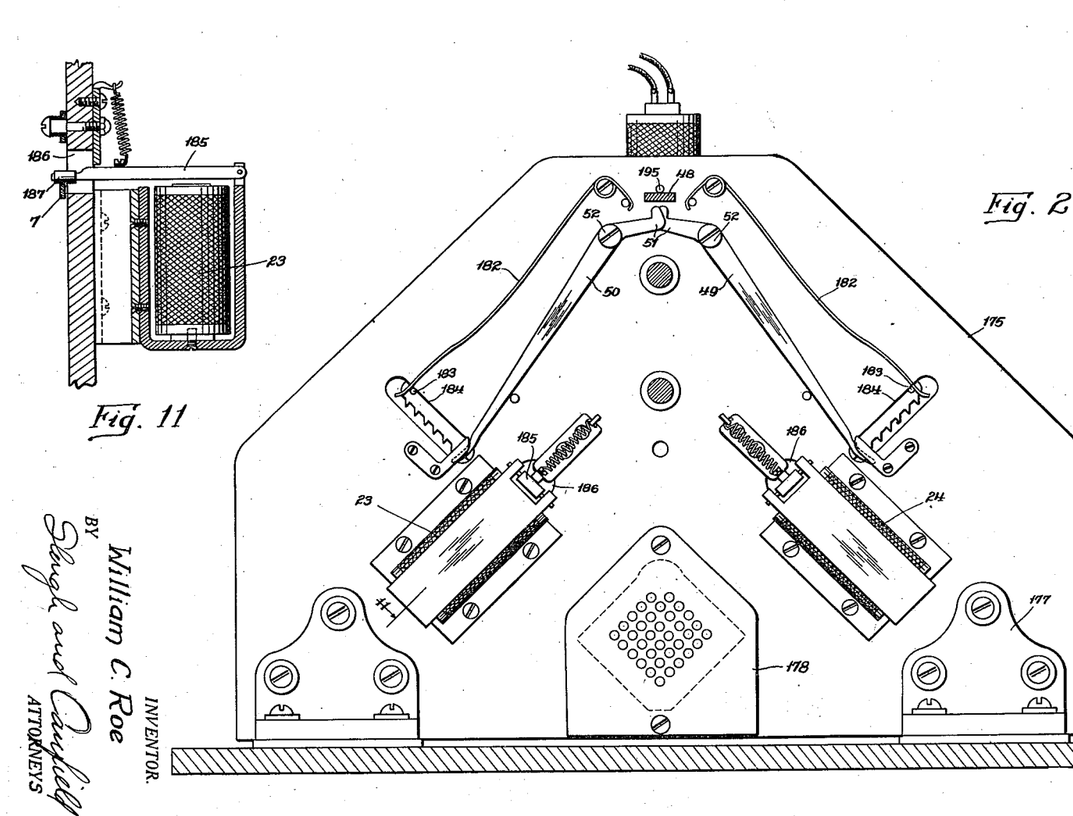
Fig. 2 is a view similar to Fig. 1 but taken from the opposite side of the panel and with parts broken away and omitted for simplicity.
Fig. 11 is a fragmentary sectional view of a part of Fig. 2 taken approximately on the plane 11 of that figure.
Figures 4, 5, 6:
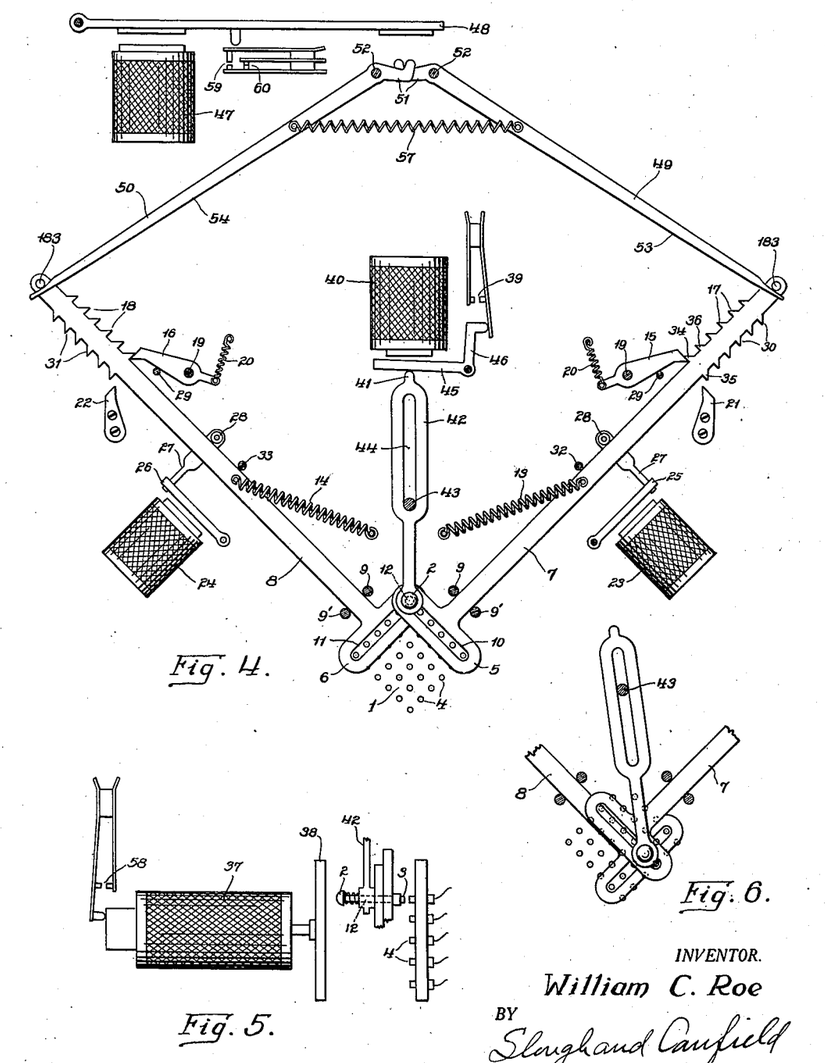
Fig. 4 is a diagrammatic view illustrating parts of the mechanism of Figs. 1, 2 and 3.
Fig. 5 is a diagrammatic view illustrating other parts of the mechanism of Figs. 1, 2 and 3.
Fig. 6 is a fragmentary view of a part of Fig. 4 illustrating parts thereof in different positions.

In the embodiment of my invention illustrated, and referring to the drawings, Fig. 4, I have indicated at 1 a bank of contact points arranged in the form of a square. At 2 I have indicated the head of a plunger contact 3 adapted to be moved longitudinally, by means to be described. The contact points 4—4 etc. are disposed, in the particular embodiment of my invention illustrated, in six rows of six contacts each. The contact in the upper corner of the bank 1 as the parts appear in Fig. 4 is omitted, thus providing thirty-five contact points 4. The exact pattern in which these points are disposed is best illustrated in Fig. 2, to be referred to later.

By a mechanism and circuit of connections which will now be described, the plunger contact 3 may be moved selectively to a position directly over any one of the contact points 4 and then operated by the head 2 to move the point 3 into engagement with a point 4 to close an electric circuit, and then the point 3 may be returned to its normal or neutral or off position illustrated ready for another selective movement.

At 7 and 8 are two rods or bars mounted for longitudinal movement, the lower ends being guided between spaced pins 9' and 9. On the lower ends of the bars 7 and 8 are, respectively, heads 5 and 6 provided with slots 10 and 11 disposed transversely of the bars 7 and 8. In the normal position shown, the slots 10 and 11 are disposed directly over and coextensive with the upper lateral rows of contacts 4. The plunger 12 carrying the contact 3 extends through both of the slots 10 and 11, the heads 5 and 6 overlapping each other for this purpose.

As will now be understood, if the bars 7 and 8 are moved downwardly, either one at a time or both together, the plunger 12 will be moved and the contact 3 thereof will be moved. If the bar 7 alone moves, the contact 3 will be moved to take up positions over the upper left-hand row of contacts of the bank 1. If the bar 8 alone is moved, the contact 3 will correspondingly take up positions over the upper right-hand row of contacts. If both bars are simultaneously or successively moved by equal amounts, the contact 3 will take up positions over the contacts in the vertical medial row or diagonal row. And correspondingly, if both bars are moved and one of them is moved more than the other, the contact 3 may be made to take up positions over any of the other contacts of the bank. In Fig. 6 the contact 3 has been moved to take up a position over a contact 4 in the fifth row from the upper left-hand side of the bank and in the third row from the upper right-hand side of the bank.

Thus, by suitable movements of the bars 7 and 8, the contact 3 may be selectively moved to occupy a position over any selected contact 4 of the bank 1.

The bars 7 and 8 are at all times under the constraint of springs 13 and 14 tending to propel the bars downwardly. The bars in their normal positions shown are latched against movement by pawls 15 and 16 engaging teeth 17—17 and 18—18 on the bars. The pawls 15 and 16 may be oscillated on pivots 19 by springs 20 and the teeth 17 and 18 are formed like ratchet teeth whereby, upon upward movement of the bars, the teeth 17 may trip over the resiliently movable pawls 15 and 16.

Opposite the pawls 15 and 16 are stationary pawls 21 and 22 spaced from the bars 7 and 8 laterally. Opposite sets of teeth 30 and 31 are disposed on the bars opposite to the teeth 17 and 18, shaped similarly to the teeth 17 and 18 respectively, and engageable by the stationary teeth 21 and 22 in a manner to be described. Stops 29—29 prevent rotary movement of the pawls 15—16 beyond a predetermined amount. At 23 and 24 are indicated electromagnetic devices having movable armatures 25 and 26 provided with arms 27 on the outer ends of which are rollers 28 engaging the opposite side edges of the bars 7 and 8.

If the magnet such as the magnet 23 is energized, and attracts its armature 25, the roller 28 will be drawn toward the magnet and rock the outer end of the bar 7 to disengage the teeth 17 from the pawl 15. The tooth which is in engagement with the pawl 15 is indicated at 34. Movement of the bar 7 to disengage the tooth 34 moves the opposite tooth 35 into a position above the tooth 21, the latter being spaced downwardly longitudinally of the bar 7 a distance approximately one-half of the pitch of the teeth 17 and 30. When the tooth 34, therefore, leaves the pawl 15, the bar 7 will be propelled downwardly longitudinally and the tooth 35 will come into engagement with the tooth 21, and movement of the bar will be stopped. If, then, current in the electromagnet 23 be broken, the spring 13 will return the bar 7 toward its stop 32, withdrawing the tooth 35 from the tooth 21, and moving a second tooth 36 of the group 17 to a position above the pawl 15. When the tooth 35 leaves the tooth 21, the bar 7 will be propelled longitudinally by the spring 13 and the tooth 36 will engage and be stopped upon the pawl 15.

Thus, by energizing and then de-energizing the electromagnet 23, as by an impulse of current, the bar 7 will be moved successively, laterally, longitudinally, and retracted laterally and will have effected a longitudinal movement thereof equal to the pitch of the teeth 17. Pitch distance is provided to be the same as the distance between the rows of contacts 4 in the bank 1. A second impulse in the winding of the magnet 23, will propel the bar 7 ahead another step, and thus the bar may be propelled any number of steps from one to five, there being a total of six teeth in the groups 17 and a total of six rows of contacts 4 in the bank 1.

The above described operation in connection with the bar 7 may be performed with the bar 8 by impulses of current given to the electromagnetic winding 24 in a manner that will now be clear.

Thus, by giving one impulse to either the electromagnet 23 or 24, or by giving a number of impulses from one to five to either of the magnets 23 and 24, or to both of them simultaneously or successively, the plunger contact 3 on the plunger 12 may be selectively moved to a position directly over any selected one of the contacts 4 of the bank 1.

Referring to Fig. 5, after the contact 3 has been selectively positioned as above described, an electromagnet 37 preferably of the plunger type may be actuated, and a disc 38 on the plunger thereof may be projected outwardly, toward the right, as viewed in the drawings, and may engage the head 2 of the plunger and project the plunger axially moving the contact 3 into engagement with the selected contacts 4 to close an electric circuit.

To prevent the magnet 37 from operating to close the contacts 3—4 before the contact 3 is suitably positioned over the selected contact 4, current to the winding 37 is under the control of a contact set 39, Fig. 4, which in turn is under the joint control of a magnet 40 and a stop 41. The contact set 39 is normally held open by the stop 41 when the plunger 12 is in its off position, the stop 41 being disposed on the end of a rod 42, the opposite end of which is pivotally connected to the plunger 12, the movement of the rod 42 being guided to maintain it generally in the direction of its longitudinal axis by a stationary pin 43 embraced by a slot 44 in the rod 42 and disposed intermediate the ends of the rod. Any movement of either one or both the bars 7 and 8 as above described, will withdraw the stop 41 from engagement with the armature 45 of the magnet 40, which armature through the agency of a lever arm 46, holds the contact set 39 open, and the armature 45 will tend to fall and close the contact set 39. But, by electrical circuits and connections to be described, the magnet 40 is energized by all of the impulses of current, energizing either or both of the magnets 23 and 24 and the mechanical and electrical inertia of the armature 45 or magnet 40 or both are so proportioned to prevent movement of the armature 45 until the impulses have ceased.

A magnet 47 when energized attracts an armature 48 which engages the short arm 51 of a pair of levers 49 and 50 pivoted at 52—52. The long arms 53 and 54 of the levers are adapted to engage pins 183—183 on the outer ends of the bars 7 and 8 whereby the bars 7 and 8 may be retracted to their original normal positions upon energization of the magnet 47. A spring 57 normally holds the levers 49 and 50 out of engagement with the pins 183—183. To simplify the drawings, the levers 49 and 50 have been shown in Fig. 4 in the position which they assume when acted upon by the magnet 47, that is, in their positions just after they have retracted the bars 7 and 8.

The magnet 47 is under the control of a set of contacts 58 adapted to be closed upon operation of the magnet 37. The magnet 47 when it first moves the armature 48, and before it has engaged the levers 49 and 50, closes a set of contacts 59 and opens the set of contacts 60. In a manner to be described, the contacts 59 close a holding circuit for the magnet 47 and the contacts 60 break the circuit of the magnet 37. The said holding circuit for the magnet 47 is also controlled by the contact set 39 of the magnet 40. Thus, the magnet 47 cannot operate to reset the bars 7 and 8 until after the magnet 37 has completed its stroke, and the magnet 47, before it moves the levers 49 and 50, opens the circuit of the magnet 37 to disengage the contacts 3 and 4, and by making a holding circuit for itself through the contacts 39, which are at the present time in closed position, the magnet 47 is maintained energized until it completes its function of returning the bars 7 and 8, whereupon the rod 42 by means of the stop 41 engages the armature 45 and lifts it thereby opening the contact set 39, de-energizing the magnet 47. The parts are now all returned to their original positions.

Figure 7:
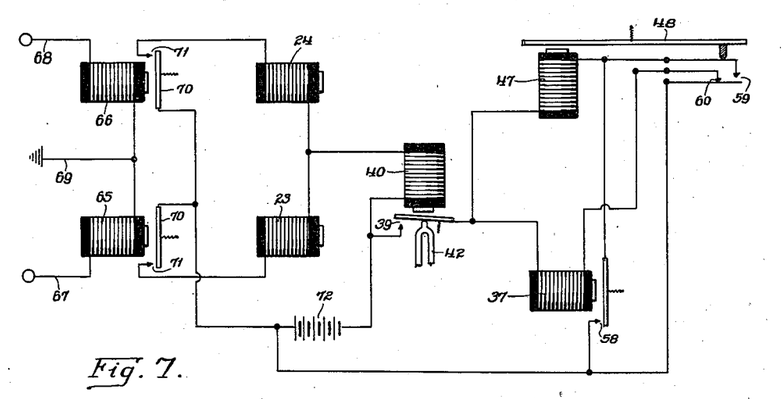
Fig. 7 is a diagrammatic view illustrating certain electromagnetic parts of the selective receiver of Figs. 1 to 6 and a system of connections whereby the receiver may be selectively operated.

A suitable circuit of connections for energizing the above described parts is shown in Fig. 7. Current from the sending station is received on wires 67 and 68 in impulses or groups of impulses from a sending or transmitting instrument, to be referred to. The current impulses energize, respectively, relay magnets 65 and 66, and their circuit is completed on a ground connection 69. By means of armatures 70—70 and contacts 71—71, the relays 65 and 66, respectively, control the energization of the magnets 23 and 24 described above. The circuit for these magnets is from a local battery or like source 72, through the contacts 71 of the relays and the windings of the magnets 23 and 24 and thence by way of magnet 40 back to the battery 72.

The contact 39 associated with the magnet 40 is held open by the magnet 40, energized by the impulses through the magnets 23 and 24 during the period of removal of the rod 42 by the action of the magnets 23 and 24, and after the impulses cease, the contact 39 closes. The magnet 37 is then energized from the local source 72 through the contact set 39 and through the contact 60, the current then returning to the source 72. Operation of the magnet 37 to make a circuit through the contacts 3 and 4 as above described, also closes the contact set 58 and energizes the magnet 47 from the source 72 through the contact 39, magnet 47, contact 58 and back to the source 72. The actuation of magnet 47 first closes the contact set 59, whereby a retaining circuit is made for the magnet 47 from the source 72, contact 39, magnet 47, contact 59 and back to the source. The movement of the armature 48 which closes the contact 59 continues and breaks the contact set 60, thus de-energizing the magnet 37. The magnet 37 being de-energized, the contacts 3 and 4 are broken and the mechanical engagement of the disc 38 with the head 2 of the plunger 12 which operates the contact 3, is broken, and this occurs before the magnet 47 operates the armature 48 enough to start return of the bars 7 and 8 to their normal positions.

Return movement of the bars 7 and 8 returns the rod 42 and breaks contact at 39, which de-energizes magnet 47, restoring all the parts to their original positions.

It will now appear that upon the reception of an impulse on either of the wires 67 or 68 in Fig. 7, or upon both of them simultaneously, or upon the reception of a group of impulses on one or both of these wires, the apparatus of Fig. 4 connected as in Fig. 7 will be energized and one of the contacts 4 of the bank 1 will be selected and an electric circuit closed thereat.

This invention relates particularly to the selective receiving apparatus and any suitable apparatus may be employed to transmit from a distant station over the wires 67 and 68 the said impulses. One type of such impulse transmitting apparatus will now be briefly referred to, the same being more fully set forth in copending application, Serial No. 134,882, filed Sept. 11, 1926.

Figure 9:
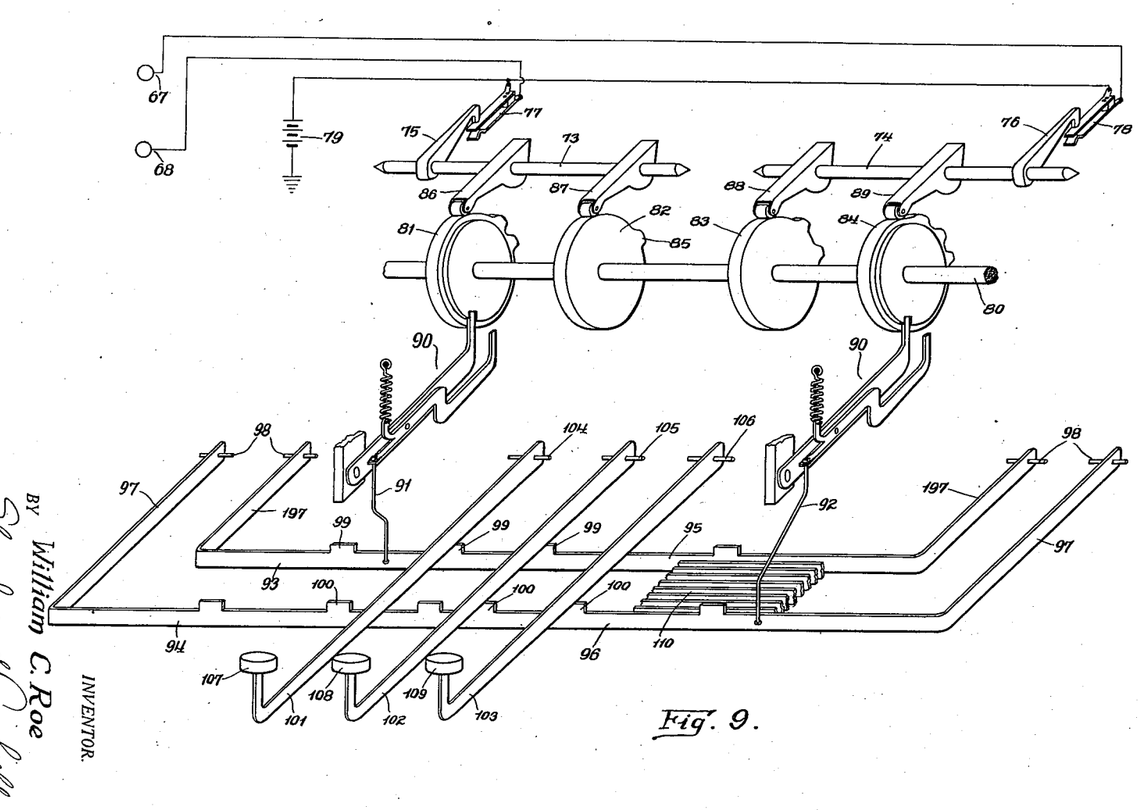
Fig. 9 is a diagrammatic view in simplified form of one type of current impulse sender or transmitter which may be employed in connection with my invention to transmit receiver operating impulses to a remotely situated selective receiver such as illustrated in the preceding figures.

Referring to Fig. 9, which illustrates in semi-diagrammatic form and greatly simplified an impulse transmitter, I have shown at 73 and 74 a pair of rocker shafts provided, respectively, with switch operating arms 75 and 76 secured thereto and, adapted, when the shafts are rocked, to close contact sets indicated at 77 and 78. Upon closure of the contacts 77 or 78, current may flow from a local source such as a battery 79 to the contacts and thence over wires 67 and/or 68, these being the receiving wires indicated in Fig. 7.

Below the shafts 73 and 74 is a continually rotatable shaft 80, a plurality of cams 81 to 84 inclusive are associated with the shaft 80 and are normally stationary, that is, non-rotating, and are adapted to be clutched to the shaft 80 in a manner to be described, to selectively rotate them. The cams are provided with camming portions such as the portion 85 on the cam 82. The cams may have any number of camming portions, but in a preferred construction, the cams are arranged in two groups of five each and the cam portions vary from one to five on each group. The shafts 73 and 74 have secured thereon cam followers 86 to 89 inclusive adapted to be operated by the cam portions of the cams 81 to 84.

Upon rotation of a cam such as the cam 82, the cam portion 85 will operate the arm 87 and rock the shaft 73 to momentarily close the contact 77 and send an impulse of current over the wire 68. Similarly, a cam having more than one cam portion will send more than one impulse, that is, a group of several impulses.

In a transmitter having two groups of cams of five to the group, each group operating in connection with one of the shafts 73 and 74, and successive cams of each group having cam portions in number, varying from one to five, it will now be clear that by clutching one or more of the cams to the shaft 80, for one revolution of the shaft 80, any number of impulses from one to five may be sent out over the wires 68 and 67, singly or simultaneously.

To selectively clutch the cams to the shaft 80, I provide a mechanism indicated generally at 90 operable by a downward pull upon a connecting rod 91. It is not deemed necessary here to describe in full this mechanism inasmuch as it is described completely in pending application, Serial No. 134,882, filed Sept. 11, 1926, and a similar mechanism is fully described in pending application, Serial No. 490,466, filed Oct. 22, 1930.

It is deemed sufficient here to say that upon a downward pull on the rod 91, the cam 81 associated with the mechanism 90 will be clutched with the shaft 80 and rotated thereby. Similar mechanisms 90 may be provided for each of the other cams on the shaft 80. In Fig. 9, two such mechanisms 90 have been indicated, having connecting rods 91 and 92 respectively.

At their lower ends the connecting rods 91 and 92 are connected to bars 93 and 94 having transverse portions 95 and 96 and longitudinal arms 197—197 and 97—97, the arms being pivoted at their rear ends, as indicated at 98—98 to stationary supports, not shown. The transverse portions 95 and 96 are provided with upwardly disposed projections 99—99 and 100—100 disposed along the transverse portions according to a system that will presently be understood.

Operating keys 101, 102 etc. pivoted at one end on the stationary pivots 104, 105 etc. are disposed across and above the transverse portions of the bars, 95, 96 etc., and are provided with indicia bearing portions 107, 108 etc. In a preferred form of transmitter, there is a bar 93, 94 for every cam on the shaft 80 and thus there may be ten of them, as indicated at 110. There preferably will be as many key bars 101 etc. as there are possible combinations, singly and jointly, of the cams on the shaft 80. A sender to cooperate with the selective receiver above described will have thirty-five key bars 101 etc. Upon depressing a key bar by the portions 107, 108 etc., the bar will engage the projections, 99, 100 etc. and depress the bars 93 and 94 thereby pulling downward on the rods 91, 92 for the purpose above described. The projections 99 and 100 etc. are so disposed on the various bars that in each case, a key bar 101 etc. will depress either one or two of the bars therebelow, and by properly disposing the projections 99 etc., each key bar 101 when depressed will depress a different one or a different pair of the bars 93 etc. and correspondingly rotate a different one or pair of cams 81 etc.

It will now be clear that upon pressing selectively a key bar 101 etc., the desired impulse or group of impulses may be sent over the wires 67 and/or 68 as hereinbefore described and referred to.

Hereinbefore, the selective engagement of the plunger contact 3 with a contact 4 of the bank 1 has been referred to as closing an electric circuit, in each case. By reference to Fig. 8, these circuits will now be described.

Figure 8:
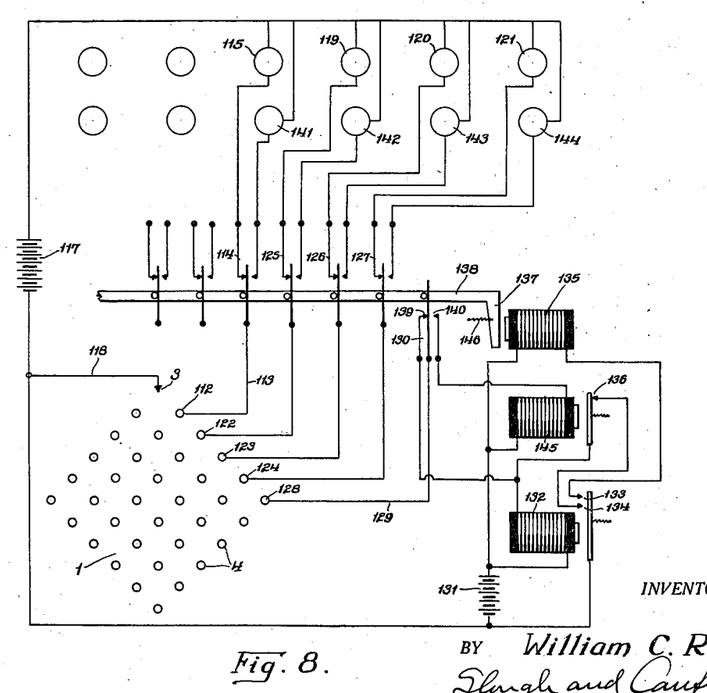
Fig. 8 is a diagrammatic view illustrating circuits which may be controlled by the selective receiver in the operation thereof.

The plunger contact 3 is reproduced diagrammatically and is shown in its normal or neutral position at the upper diagonal corner of the bank 1. It will be understood from the foregoing description that the contact 3 may be selectively moved into engagement with any one of the contacts 4. Current may be conducted to the contact 3 from a suitable local source such as a battery 117 by a conductor 118, and upon engagement of a contact 4, for example the contact 112, current may then flow from the source 117 through said contact and by wire 113 through the pole 114 of a single pole double throw switch, and thence to a lamp, indicator, or other signaling or indicating means 115 and thence back to the source 117. In a similar way, lamps or indicators 119 to 121 inclusive may be energized by engagement of the contact 3 with contacts of the bank 122 to 124 inclusive, the current flowing through corresponding single pole double throw switches 125, 126, 127.

Inasmuch as there are thirty-five contacts 4 of the bank 1, thirty-five such indicators as 115 may thus be selectively actuated. My invention, however, comprehends means whereby a greater number of indicators such as 115 may be actuated by the thirty-five contacts 4. To this end the total number of actuatable indicators is divided into two groups, and one of the contacts 4, namely contact 128, is reserved to actuate mechanism now to be described for shifting from one group to the other group.

Upon engagement of the contact 3 with the contact 128, current flows from a local source 131 by wire 129 through one pole of a single pole double throw switch 130 and thence through an electromagnet 132, which operates to close two contacts at 133, and 134. The contact 133 closes a circuit from the source 131 through an electromagnet 135 and back to the source, and the contact 134 closes a holding circuit for the magnet 132 from the source 131 through a relay contact 136, to be described, and back to the source.

The energization of the magnet 135 causes it to act through a spring retracted armature 137 to longitudinally shift a switch shifting bar 138 adapted to simultaneously shift or throw all of the above described single pole double throw switches 114, 125 to 127 and 130. Throwing of the switch 130 breaks the contact at 139 which originally energized magnet 132, but this magnet is now held closed on its own circuit above described and stays closed, continuously energizing the magnet 135. The contact is closed at 140 on the switch 130, but current by this time has stopped flowing from the contact 128 on wire 129 and no change is effected by closing the contact 140. All of the single pole switches are thus held in their thrown position. If, then, the contact 3 be selectively moved into engagement with one of the contacts 4, such as the contact 112, current will flow as before along wire 113 but will take another circuit through the double throw switch 114, as will be understood, and will energize a lamp or other indicator 141 instead of the indicator 115. Similarly, the other contacts such as 122 to 124 inclusive will energize other indicators 142 to 144 inclusive. Thus, by first selectively engaging contact 128 of the bank 1, a group of thirty-four indicators such as that at 141 may then be selectively energized by selectively engaging the contact 3 with other contacts 4. Whereas, before engaging contact 128, selective engagement of the contacts 4 selectively energized another group of thirty-four indicators, such as the indicator 115.

To now restore the apparatus to selectively energize the first group of indicators such as 115, another selective engagement of the contact 3 with the same contact 128 is made, whereupon current flows through wire 129, closed contact 140, energizing a magnet 145 from a source 131. The magnet 145 breaks a circuit at the contact 136, thus de-energizing magnet 132 which breaks contacts at 133 and 134, the contact 133 controlling magnet 135, deenergizing the same, whereupon a spring 146 retracts the armature 137 and the bar 138 restoring all of the double throw single pole switches indicated to their original positions and restoring the circuits and apparatus to the condition where selectively engaging contacts 4 will energize the group of indicators of which the indicator 115 is one.

In the operation of the complete system as thus far diagrammatically illustrated and described, it will now be understood that upon sending to the receiver from a distant station over the wires 67 and/or 68 one impulse or a group of impulses from two to five on one wire alone or on the other wire alone or on both wires simultaneously, the apparatus will instantly operate to move the contact 3 into engagement with a corresponding one of the contacts 4 of the bank 1 making momentary contact only therewith and then breaking the contact, and then the contact 3 will be returned instantly to its neutral position. During the momentary contact of 3 and 4, a single impulse of current is sent through the selected indicating means such as 115, actuating the same, momentarily. It will be further understood that when a suitable impulse or impulses is sent to the receiver, the contact 3 will momentarily engage the contact 128 and the impulse of current initiated thereby will shift the apparatus so as to bring into actuatable circuit condition another group of indicators, such as the indicator 141, and that thereafter by again moving the contact 3 into engagement with the contact 128, and initiating a momentary impulse, the apparatus will be restored for actuation of the first group of indicators.

Obviously, when a sending or transmitting apparatus such as briefly described and illustrated in simplified form in Fig. 9 is employed, the keys on the key bars may be marked with indicia corresponding to the indicator to be actuated at the distant station and one of the key bars may be marked as the shift bar for shifting from one group of indicators to the other.

Thus, upon selecting a key of the transmitter, and depressing it, a corresponding indicator of one or the other of the group will be actuated at the receiving station and by employing a bank of contacts 4, thirty-five in number, a total of sixty-eight indicators and sending keys therefor may be employed.

As to the indicators 115 etc., these may be lamps; or they may be themselves electromagnetic devices initiating the action of other apparatus; or they may be each a means such as an electromagnetic means for actuating a corresponding type bar or letter of a typewriter or other reproducing machine; or the indicator such as 115 may be of other types and operate in other manners as may occur to those skilled in this art.

With the arrangement diagrammatically illustrated in Fig. 8, the indicators or other devices 115 are momentarily energized only. When it is desired that the devices 115 etc. shall, after energization, remain energized, the arrangement diagrammatically illustrated in Fig. 10 may be employed.

Figure 10:
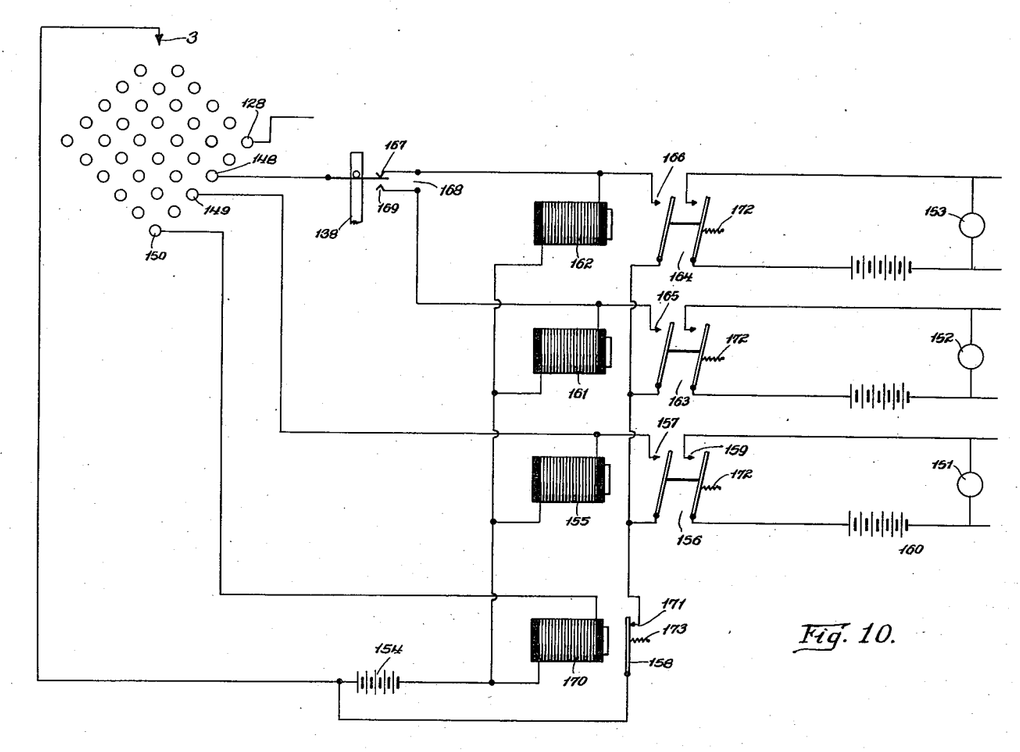
Fig. 10 is a diagrammatic view illustrating another type of circuit which may be controlled by the selective receiver in the operation thereof.

If the contact 3 be selectively moved into engagement with the contact 149 current from a local source 154 may flow through the contacts 3—149 energizing a magnet 155 and thence flow back to the source. The magnet 155 closes a single throw double pole switch 156. The contact 157 of the switch when closed makes a holding circuit for the magnet 155, current flowing from the source 154 through a cutout switch 158, contact 157, magnet 155, back to the source, so that after the momentary engagement of contacts 3 and 149, the switch 156 will continue to be held closed. The other contact 159 on the switch 156 closes and holds closed the circuit of a device to be continuously energized, 151, the energy for which may be taken from a local source 160. The device 151 may be any type of electrical device and may be in the nature of an indicator or in the nature of a power device such as an electric motor. Similarly, the other devices 152 and 153 may be actuated and continuously energized. The circuits for these devices are controlled by switches 163 and 164 operative by magnets 161 and 162 from the same source 154 and under the control of the same cutout switch 158. The magnets 161 and 162 make holding circuits for themselves on contacts 165 and 166, respectively. If desired, the devices 153 and 152 may, respectively, be of different groups of devices and thus under the control of the shift contact 128, the operations and functions of which have been described in connection with Fig. 8. With the connections as shown in Fig. 10 if the contact 148 is selected, the device 153 will be energized and remain energized, and other devices of the same group similarly energized may be one at a time similarly energized. If, however, it be desired to energize the device 152 and others of its group, the shift contact 128 may first be selected whereupon the bar 138 will be longitudinally moved, breaking contact 167 on the double throw single pole switch 168 and making contact at 169 thereon to energize the magnet 161.

It will be understood that there may be any number of magnets, such as the magnet 155 controlling corresponding numbers of devices such as 151, and that there may be any number of magnets such as 161 and 162 controlling corresponding devices in two groups.

At any desired time after the devices 151 to 153 have been under continuous actuation, their energization may be discontinued. To effect this, the contact 150 may be selected by the contact 3, energizing the magnet 170 from the local source 154, which magnet operates the cutout switch 158 to open the contact at 171, thus breaking all of the holding circuits of all of the magnets 155, 161, 162 etc., and permitting the corresponding switches 156, 164, 163 to be opened by springs 172—172. The energization of magnet 170 may be momentary and it will first de-energize the said magnets and then be itself de-energized, permitting a spring 173 to reclose the contact at 171 for succeeding operations.

Thus, means is provided whereby a plurality of indicating or power devices may, one after the other, be actuated and remain continuously energized, and at the end of a desired interval, all of them de-energized simultaneously.

The apparatus heretofore described in connection with diagrammatic Figures 4 to 10 inclusive may have a preferred embodiment in actual apparatus such as illustrated in Figs. 1 to 3 and 11.

Referring to these figures, the apparatus is all mounted on a suitable panel 175 of metal vertically disposed and supported on a horizontal base of metal 176, the panel and base being preferably insulated from each other by connecting brackets 177.

Figure 1:
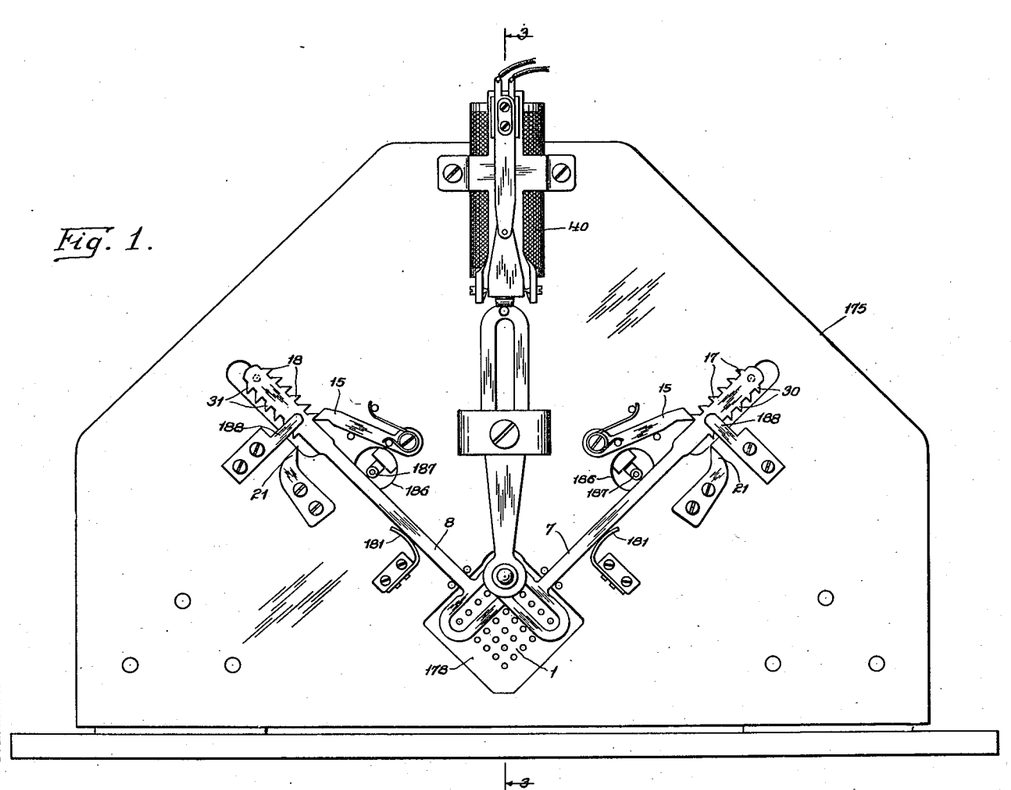
Fig. 1 is a front elevational view of a selective receiver forming part of an embodiment of my invention and showing certain apparatus which I may employ mounted upon a generally vertically disposed panel.
Figure 3:
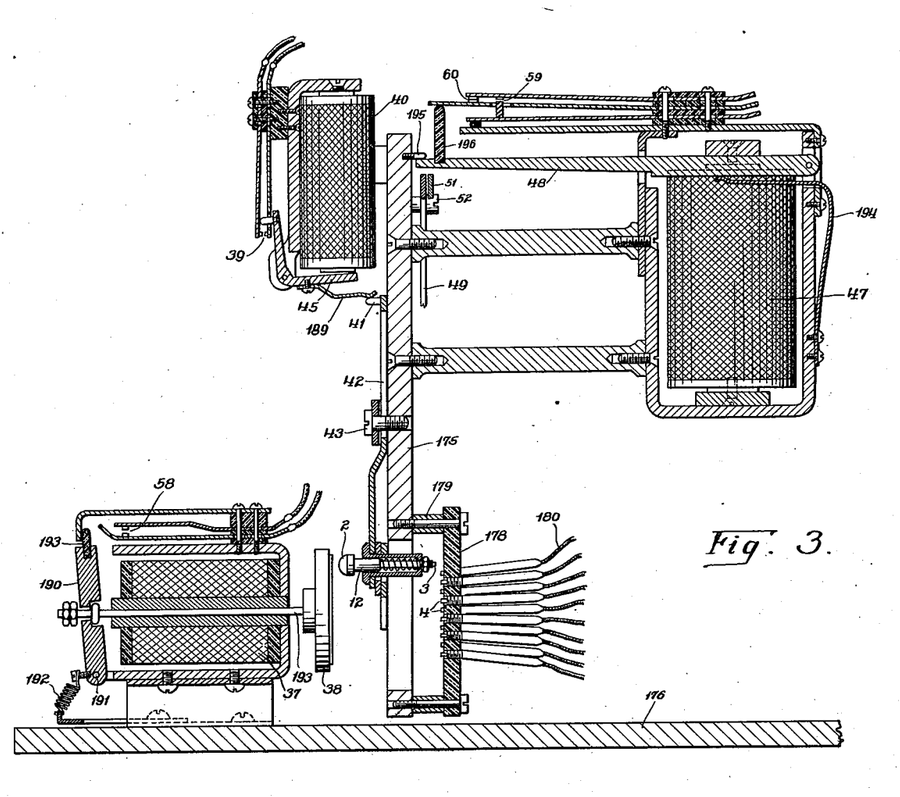
Fig. 3 is a cross-sectional elevational view taken approximately on the plane 3—3 of Fig. 1.

The contacts 4 are mounted in an insulating panel 178 supported on the panel 175 by posts 179 and the contacts have connection with the wires 180 leading therefrom.

The bars 7 and 8, instead of having a single spring 13 or 14, as in the diagram, to propel them longitudinally and constrain them to move laterally are, in the actual apparatus illustrated, constrained to move laterally by springs 181 mounted on the panel 175 and are adapted to be propelled longitudinally by springs 182 on the opposite side of the panel and engaging pins 183 on the bars 7 and 8 which project through suitable openings 184 in the panel 175.

The magnets 23 and 24 on the panel 175, for effecting the notching ahead of the bars 7 and 8, comprise spring retracted armatures 185 projecting through suitable openings 186 in the panel 175, the ends of which are provided with rollers 187 engaging the bars 7 and 8 on the opposite sides thereof from the springs 181. The bars 7 and 8 are guided in their movement by tongues 188 mounted on the panel 175 and overlapping the bars.

As shown in Fig. 3, the stop 41 on the upper end of the rod 42 rocks the armature 45 of the magnet 40 to its attracted position by a resilient spring 189 and the contact set 39 is thus held open as described in connection with Fig. 4. Referring to the magnet 37, Fig. 3, it is mounted on the base 176 and the head or disc 38 operated thereby is propelled to engage the head 2 of the plunger 12 by an armature 190 pivoted at 191 and spring retracted as at 192. A plunger rod 193 is connected to the disc 38 and to the armature 190 and slidably moves in a bore in the core of the magnet 37. The contact set 58, adapted to be closed upon energization of the magnet 37, is operated by a finger 193 on the armature 190.

The magnet 47 is mounted on the vertical panel 175 on the side opposite the bars 7 and 8. It has an armature 48 normally retracted by a spring 194 engaging a stop 195 on the panel. The contact set 59, normally open, is held open by a post 196 on the armature, which post also normally holds closed the contact set 60. Upon attraction of the armature 48, the contact set 59 closes and the set 60 opens, as described in connection with Fig. 4.

A means for returning the bars 7 and 8 is shown fragmentarily in Fig. 3, but is more completely shown in Fig. 2, where the end of the armature 48 and its stop 195 are reproduced. When the armature 48 is attracted it moves downwardly, in Fig. 2, and engages the ends of the short lever arms 51 of the levers 49 and 50, rocking the levers on their pivots 52, and causing the lower ends of the levers to engage pins 183 on the bars 7 and 8, and to retract the bars 7 and 8 against the tension of the springs 182.

Having thus described a specific embodiment of my invention, which is illustrated in the drawings, I am aware that numerous and extensive departures may be made from the embodiment, system, and apparatus herein illustrated and described, and coming within the purview of my invention and employing my improved method of selection broadly considered, and I therefore contemplate as coming within the scope of the claims hereof any and all such embodiments of my invention.

I claim:—

1. In an electric system and apparatus for the transmission of intelligence, a selective receiver responsive to two sets of current impulses transmitted thereto from a distant station, the receiver comprising two relatively angularly movable elements, electrical means associated with each element one electrical means responsive to one set of impulses and the other electrical means responsive to the other set to move the corresponding movable elements selective distances, a selecting element movable to selective positions by the joint concurrent movement of said movable elements, electro-responsive means responsive to cessation of said impulses to effect a supplemental movement of the said selecting element, and electro-responsive means actuated in response to the actuation of said first named electro responsive means to move said movable elements to a normal position.

2. In an electrical selecting apparatus, a pair of elements mounted for reciprocation in angularly related directions, resilient means tending to move them in one reciprocatory direction, an electrically actuated escapement means for each element permitting a step by step movement thereof over selective distances in response to selective sets of electrical impulses transmitted to the escapement means, a second movable element movably connected with said pair of elements and movable to selective positions by the joint movement of said elements, a second electrically actuated means for giving a supplemental movement to the second movable element at the end of its selective movement, and a third electrically actuated means for thereafter moving the pair of movable elements in the other reciprocatory direction to a normal position, the said second movable element being returned to a normal position by the return movement of said pair of elements.

3. In an electrical selective apparatus, a pair of elements mounted for reciprocation in angularly related directions, resilient means tending to move them in one reciprocatory direction, an electrically actuated escapement means for each element permitting a step by step movement thereof over selective distances in response to selective sets of electrical impulses transmitted to the escapement means, a second movable element movably connected with said pair of elements and movable to selective positions by the joint movement of said elements, a second electrically actuated means for giving a supplemental movement to the second movable element at the end of its selective movement, and a third electrically actuated means for thereafter moving the pair of movable elements in the other reciprocatory direction to a normal position, the said second movable element being returned to a normal position by the return movement of said pair of elements, and said third electrically actuated means comprising a pair of pivoted levers engaging the pair of elements for moving them.

4. In an electrical system and apparatus for the transmission of intelligence, a selective receiver responsive to two sets of current impulses transmitted thereto from a distant station, the receiver comprising two relatively angularly movable elements, electrical actuable means associated with each element one electrical means responsive to one set of impulses and the other electrical means responsive to the other set to effect movement of the corresponding movable elements selective distances, a selecting element movable to selective positions by the joint concurrent movement of said movable elements, electro-responsive means responsive to cessation of said impulses to effect a supplemental movement of the said selecting element, and electro-responsive means actuated in response to the actuation of said first named electro-responsive means to move said movable elements to a normal position.

5. In an electrical selecting apparatus, a pair of elements, mounted for reciprocation in angularly related directions, energy storage means comprising means tending to move them in one reciprocatory direction, an electrically actuated escapement means for each element permitting a step by step movement thereof over selective distances in response to selective sets of electrical impulses transmitted to the escapement means, a second movable element movably connected with said pair of elements and movable to selective positions by the joint movement of said elements, a second electrically actuated means for giving a supplemental movement to the second movable element at the end of its selective movement, and a third electrically actuated means for thereafter moving the pair of movable elements in the other reciprocatory direction to a normal position and for storing energy in the energy storage means, the said second movable element being returned to a normal position by the return movement of said pair of elements.

6. In an electrical selecting apparatus, a pair of elements mounted for reciprocation in angularly related directions means tending to move them in one reciprocatory direction, an electrically actuated escapement means for each element permitting a step by step movement thereof over selective distances in response to selective sets of electrical impulses transmitted to the escapement means, a second element and a bank of selective elements movable relatively one of which being connected with said pair of elements and movable therewith by joint movement thereof to selective positions in which the said second element is aligned with a selected element of the bank, a second electrically actuated means effecting relative movement of the said aligned elements to mutually engage them and a third electrically actuated means for thereafter moving the pair of movable elements in the other reciprocatory direction to a normal position the said element connected to the pair of elements being returned to a normal position by the return movement of said pair of elements.

7. In an electrical selecting apparatus, a pair of elements mounted for reciprocation in angularly related directions, energy storage means comprising means tending to move them in one reciprocatory direction, an electrically actuated escapement means for each element permitting a step by step movement thereof over selective distances in response to selective sets of electrical impulses transmitted to the escapement means, a second element and a bank of selective elements, movable relatively and one of which being connected with the pair of elements and movable therewith by joint movement of said elements to selective positions in which the second element is aligned with a selected element of the bank, a second electrically actuated means effecting relative movement of the said aligned elements to mutually engage them and a third electrically actuated means for thereafter moving the pair of movable elements in the other reciprocatory direction to a normal position and for storing up energy in the energy storage means, the said element connected to the pair of elements being returned to a normal position by the return movement of said pair of elements.

8. In an electric system and apparatus for the transmission of intelligence, a selective receiver responsive to two sets of current impulses transmitted thereto from a distant station, a receiver comprising two relatively angularly movable elements, electrical means associated with each element, one electrical means being responsive to one set of impulses and the other electrical means responsive to the other set of impulses to effect movement of the corresponding movable elements selective distances, a relatively removable selecting contact and bank of contacts one of which is connected with the movable elements, and the selecting contact and bank contacts being relatively movable by the joint concurrent movement of the movable elements into selected positions in which the selecting contact is aligned with a selected bank contact, electro-responsive means responsive to cessation of said impulses to effect movement of said aligned contacts to mutually engage them, a group of signals and signal controlling circuits associated with each bank contact, electro-responsive switching means and an energizing circuit therefor associated with one of the bank contacts and controlled by said contact and the selecting contacts to selectively connect the signals and signal controlling circuits to their associated bank contacts.

9. In an electrical selecting apparatus, a pair of elements mounted for reciprocation in angularly related directions, means tending to move them in one reciprocatory direction, an electrically actuated escapement means for each element permitting a step by step movement thereof over selective distances in response to selective sets of electrical impulses transmitted to the escapement means, a selecting contact and a bank of selective contacts relatively movable and one connected with the pair of elements and the selecting contact and bank of contacts being relatively movable by the joint concurrent movement of the movable elements into selective positions in which the selecting contact is aligned with a selected bank contact, a second electrically actuable means for effecting relative movement of the said aligned contacts to mutually engage them, a group of signals and signal controlling circuits, associated with each bank contact, an electro-responsive switching means and an energizing circuit therefor associated with one of the bank contacts and controlled by said contact and the selecting contact to selectively connect the signals and signal controlling circuits to their associated bank contacts, and electrically actuated means for moving the pair of movable elements in the other reciprocatory direction to a normal position.

WILLIAM C. ROE.